United States Patent
Tseng et al.

(10) Patent No.: US 10,866,481 B2
(45) Date of Patent: Dec. 15, 2020

(54) ELECTROPHORETIC DISPLAY SYSTEM AND DEVELOPING METHOD

(71) Applicant: E Ink Holdings Inc., Hsinchu (TW)

(72) Inventors: Chao-Ming Tseng, Hsinchu (TW); Yu-Hsun Kuo, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 16/416,291

(22) Filed: May 20, 2019

(65) Prior Publication Data
US 2019/0369456 A1   Dec. 5, 2019

(30) Foreign Application Priority Data
May 31, 2018 (TW) .............................. 107118624 A

(51) Int. Cl.
*G02F 1/167* (2019.01)
*G09G 3/34* (2006.01)

(52) U.S. Cl.
CPC ............. *G02F 1/167* (2013.01); *G09G 3/344* (2013.01)

(58) Field of Classification Search
CPC ................................ G02F 1/167; G09G 3/344
USPC .......................................... 345/107, 174, 690
See application file for complete search history.

(56) References Cited

U.S. PATENT DOCUMENTS

| 5,948,091 A | 9/1999 | Kerigan et al. |
| 8,383,598 B2 | 2/2013 | Kandimalla et al. |
| 10,002,588 B2 * | 6/2018 | Chen ........................ G09G 5/12 |
| 2010/0311494 A1 * | 12/2010 | Miller ................... G07F 17/3223 463/22 |
| 2014/0267316 A1 | 9/2014 | Connell et al. |
| 2015/0186091 A1 | 7/2015 | Kumar et al. |
| 2015/0289273 A1 | 10/2015 | Ermenko et al. |
| 2016/0044103 A1 * | 2/2016 | Seo ...................... H04L 67/1095 709/201 |
| 2016/0132369 A1 | 5/2016 | Lee et al. |

(Continued)

FOREIGN PATENT DOCUMENTS

| TW | 201428569 | 7/2014 |
| TW | I498772 | 9/2015 |
| TW | 201604855 | 2/2016 |

OTHER PUBLICATIONS

"Office Action of Taiwan Counterpart Application," dated Aug. 20, 2019, p. 1-p. 6.

(Continued)

*Primary Examiner* — Calvin C Ma
(74) *Attorney, Agent, or Firm* — JCIPRNET

(57) ABSTRACT

An electrophoretic display system and a developing method are provided. The electrophoretic display system includes an electronic device storing a control ware, a first electrophoretic display device coupled to the electronic device and a first application program interface (API) provided by the control ware. A first application program loads a first image data into the control ware, and calls the first application program interface. The control ware obtains a first driver of a first communication protocol of the first electrophoretic display device according to the first API. The control ware encapsulates the first image data with a first data encapsulating format according to the first driver. The control ware transmits the encapsulated first image data to the first electrophoretic display device according to the first communication protocol.

8 Claims, 4 Drawing Sheets

(56) References Cited

U.S. PATENT DOCUMENTS

| | | |
|---|---|---|
| 2016/0142467 A1 | 5/2016 | Ban et al. |
| 2016/0188181 A1* | 6/2016 | Smith ................... G06F 3/016 |
| | | 715/765 |
| 2016/0227019 A1 | 8/2016 | Seol et al. |
| 2016/0239287 A1 | 8/2016 | Lim et al. |
| 2016/0352818 A1 | 12/2016 | Han et al. |
| 2017/0048661 A1 | 2/2017 | Park et al. |
| 2017/0055028 A1 | 2/2017 | Liu |
| 2017/0061928 A1 | 3/2017 | Kim |
| 2017/0076553 A1* | 3/2017 | Washington ........ G07F 17/3276 |
| 2017/0078269 A1 | 3/2017 | Han et al. |
| 2017/0115981 A1 | 4/2017 | Oh et al. |
| 2017/0127214 A1 | 5/2017 | Sohn et al. |
| 2019/0086760 A1* | 3/2019 | Wang ..................... G02F 1/167 |

OTHER PUBLICATIONS

"Office Action of Taiwan Counterpart Application," dated Jul. 28, 2020, p. 1-p. 6.

* cited by examiner

ELECTROPHORETIC DISPLAY SYSTEM AND DEVELOPING METHOD

CROSS-REFERENCE TO RELATED APPLICATION

This application claims the priority benefit of Taiwan application serial no. 107118624, filed on May 31, 2018. The entirety of the above-mentioned patent application is hereby incorporated by reference herein and made a part of this specification.

BACKGROUND OF THE INVENTION

Field of the Invention

The invention is related to an electrophoretic display system and a developing method, and particularly related to an electrophoretic system and a developing method that allow software developer to easily realize communication with electrophoretic display and input/output.

Description of Related Art

Known electrophoretic displays may have various communication interfaces such as a wireless fidelity (WiFi) interface, a Bluetooth interface, a near-field communication interface and so on. When software developer develops application program of electrophoretic display, it is necessary to develop different application programs suitable for different communication interfaces in order to adapt to electrophoretic displays with different communication interfaces. As a result, the software developer's learning curve is longer and software developing time is longer as well. In view of the above, it is a task for practitioners of the field to find out how to simplify development of electrophoretic display application program.

SUMMARY OF THE INVENTION

The invention provides an electrophoretic display system and a developing method, capable of simplifying development of electrophoretic display application program and allowing software developer to easily realize communication with electrophoretic display so as to focus on developing application program.

The invention provides an electrophoretic display system including an electronic device storing a control ware, a first electrophoretic display device coupled to the electronic device and a first application program interface (API) provided by the control ware. The first application program loads a first image data into the control ware and calls the first application program interface. The control ware obtains a first driver of a first communication protocol of the first electrophoretic display device according to the first application program interface. The control ware encapsulates the first image data with a first data encapsulating format according to the first driver. The control ware transmits the encapsulated first image data to the first electrophoretic display device according to the first communication protocol.

According to an embodiment of the invention, the electrophoretic display system further includes a second electrophoretic display device coupled to the electronic device and a second application program interface provided by the control ware. A second application program loads a second image data into the control ware and calls the second application program interface. The control ware obtains a second driver of a second communication protocol of the second electrophoretic display device according to the second application program interface, wherein the second communication protocol and the first communication protocol are different. The control ware encapsulates a second image data with a second data encapsulating format according to the second driver. The control ware transmits the encapsulated second image data to the second electrophoretic display device according to the second communication protocol.

According to an embodiment of the invention, the control ware initializes commutation between the control ware and the first electrophoretic display device through the first commutation protocol according to the first driver.

According to an embodiment of the invention, the control ware divides the first image data into a plurality of packets with the first data encapsulating format, and transmits the packets to the first electrophoretic display device through the first communication protocol.

According to an embodiment of the invention, the first communication protocol includes a wireless fidelity (WiFi) protocol, a Bluetooth protocol, a near-field communication protocol, a serial peripheral interface (SPI) protocol, an inter-integrated circuit (I2C) protocol, a general purpose input/output (GPIO) protocol, a mobile industry processor interface (MIPI) protocol, a high definition multimedia interface (HDMI) protocol and a universal serial bus (USB) protocol.

The invention provides an electrophoretic display developing method adaptable for an electrophoretic display system. The electrophoretic display system includes an electronic device storing a control ware, a first electrophoretic display device coupled to the electronic device and a first application program interface (API) provided by the control ware. The electrophoretic display developing method includes the following step: loading a first image data into the control ware by using a first application program and calling the first application program interface. The electrophoretic display developing method further includes the following step: obtaining a first driver of a first communication protocol of the first electrophoretic display device according to the first application program interface. The electrophoretic display developing method further includes the following step: encapsulating the first image data with a first data encapsulating format according to the first driver by using the control ware. The electrophoretic display developing method further includes the following step: transmitting the encapsulated first image data to the first electrophoretic display device according to the first communication protocol by using the control ware.

According to an embodiment of the invention, the electrophoretic display system further includes a second electrophoretic display device coupled to an electronic device and a second application program interface provided by the control ware. The electrophoretic display developing method further includes the following step: loading a second image data into the control ware by using a second application program, and calling the second application program interface. The electrophoretic display developing method further includes the following step: obtaining a second driver of a second communication protocol of the second electrophoretic display device according to the second application program interface by using the control ware, wherein the second communication protocol and the first communication protocol are different. The electrophoretic display developing method further includes the following step:

encapsulating the second image data with a second data encapsulating format according to the second driver by using the control ware. The electrophoretic display developing method further includes the following step: transmitting the encapsulated second image data to the second electrophoretic display device according to the second communication protocol by using the control ware.

According to an embodiment of the invention, the control ware initializes communication between the control ware and the first electrophoretic display device through the first communication protocol according to the first driver.

According to an embodiment of the invention, the control ware divides the first image data into a plurality of packets with the first data encapsulating format, and transmits the packets to the first electrophoretic display device through the first communication protocol.

According to an embodiment of the invention, the first communication protocol includes a wireless fidelity (WiFi) protocol, a Bluetooth protocol, a near-field communication protocol, a serial peripheral interface (SPI) protocol, an inter-integrated circuit (I2C) protocol, a general purpose input/output (GPIO) protocol, a mobile industry processor interface (MIPI) protocol, a high definition multimedia interface (HDMI) protocol and a universal serial bus (USB) protocol.

Based on the above, the electrophoretic display system and developing method of the invention allow the application program to load the image data into a control ware first and call the application program interface corresponding to a specific communication protocol provided by the control ware when the application program communicates with the electrophoretic display device having a communication protocol. The control ware obtains a driver of a communication protocol of the electrophoretic display device according to the application program interface, and encapsulates the image data with a data encapsulating format according to the driver. In this manner, in the application program developed by the software developer, it is possible to directly use the application program interface provided by the control ware to communicate with the electrophoretic display device having a different communication protocol without understanding details of the communication protocol, thereby shortening the time for developing electrophoretic display device with various communication interfaces.

In order to make the aforementioned features and advantages of the invention more comprehensible, embodiments accompanying figures are described in detail below.

DESCRIPTION OF EMBODIMENTS

Figure 1:
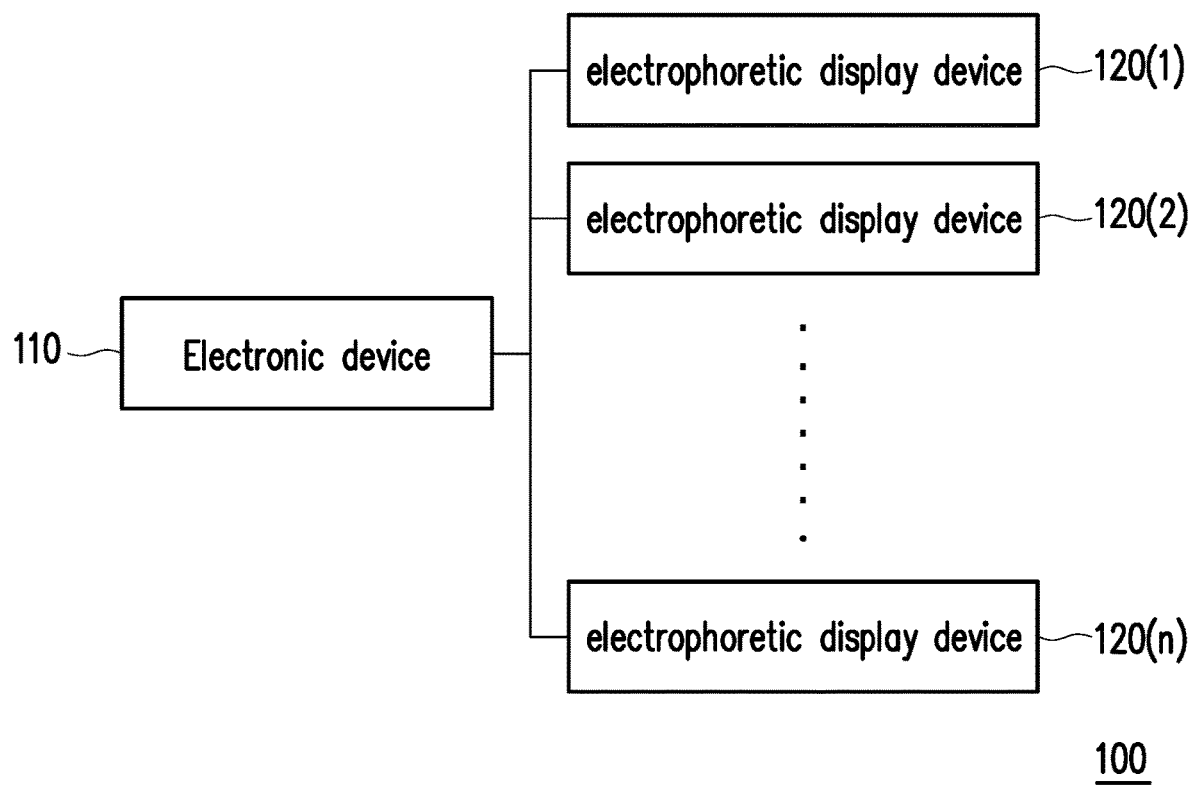
FIG. 1 is a block diagram illustrating an electrophoretic display system according to an embodiment of the invention.

FIG. 1 is a block diagram illustrating an electrophoretic display system according to an embodiment of the invention.

Referring to FIG. 1, an electrophoretic display system 100 of the invention includes an electronic device 110 and electrophoretic display devices 120(1)-120(n) coupled to the electronic device 110. The electronic device 110 may store a control ware (or referred to as electrophoretic display control ware) which allows the application program developed by software developer to directly establish communication with the electrophoretic display devices 120(1)-120(n) through the application program interface (API) provided by the control ware. Each of the electrophoretic display devices 120(1)-120(n) may have an electrophoretic display and a communication interface. The communication interface is, for example, wireless fidelity (WiFi), Bluetooth, near-field communication, a serial peripheral interface (SPI), an inter-integrated circuit (I2C), general purpose input/output (GPIO), a mobile industry processor interface (MIPI), a high definition multimedia interface (HDMI) and universal serial bus (USB). In the embodiment, each of the electrophoretic display devices 120(1)-120(n) only has a single communication interface.

The electronic device 100 may include a processor (not shown) and a memory (not shown). The processor may be a central processing unit (CPU) or a programmable general purpose or specific purpose microprocessor, a digital signal processor (DSP), a programmable controller, an application specific integrated circuit (ASIC) or other similar elements or a combination of the above. The memory may be a fixed or movable random access memory (RAM) in any forms, a read-only memory (ROM), a flash memory, a hard disk drive (HDD), a solid state drive (SSD) or a similar element or a combination of the above.

Figure 2:
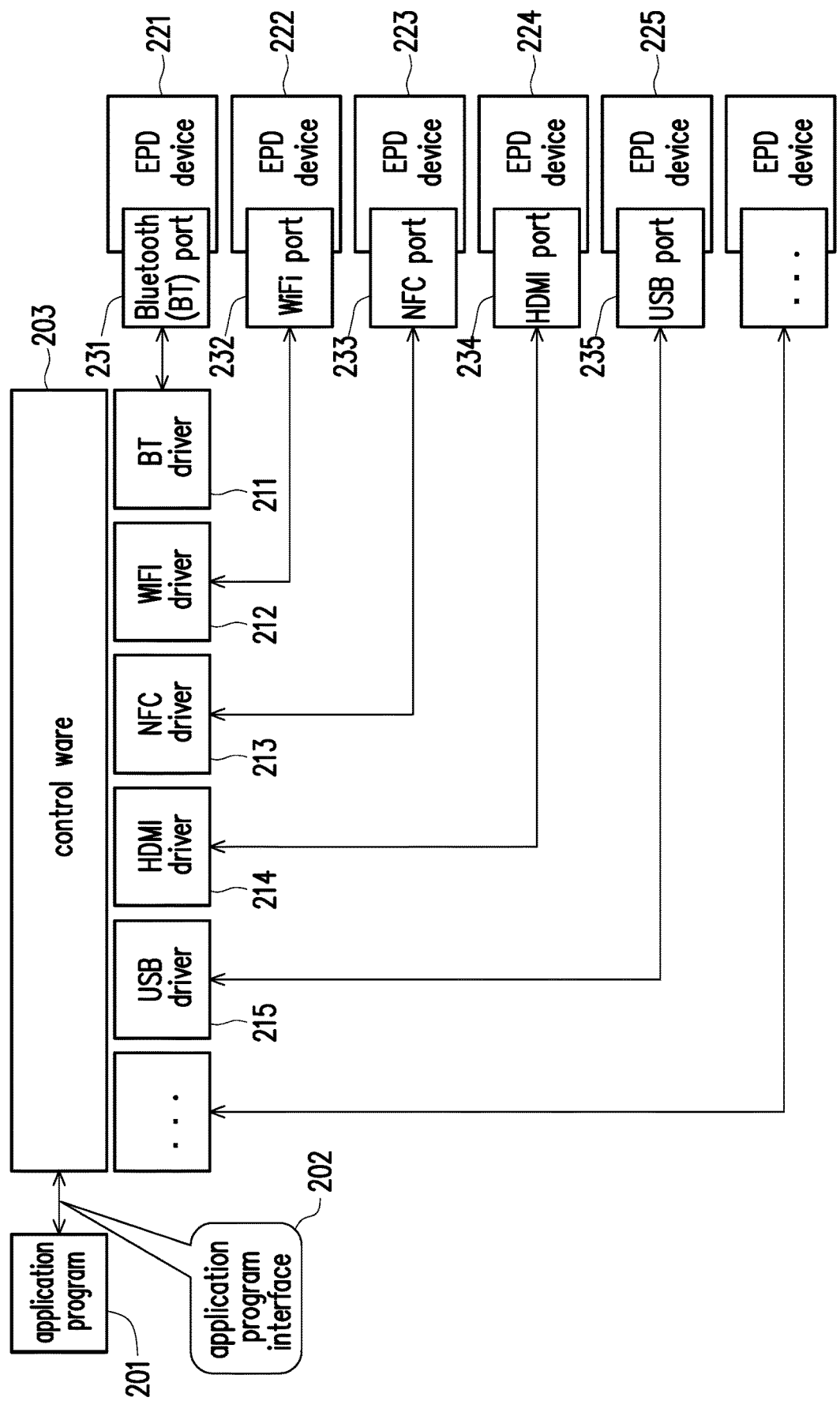
FIG. 2 is a system structural diagram illustrating an electrophoretic display system according to an embodiment of the invention.

FIG. 2 is a system structural diagram illustrating an electrophoretic display system according to an embodiment of the invention.

Referring to FIG. 2, in electrophoretic display (EPD) devices 221-225 of an embodiment of the invention, each of the electrophoretic display devices 221-225 may have different ports. For example, the electrophoretic display device 221 has a Bluetooth (BT) port 231; the electrophoretic display device 222 has a WiFi port 232; the electrophoretic display device 223 has an NFC port 233; the electrophoretic display device 224 has an HDMI port 234; the electrophoretic display device 225 has a USB port 235. When the software developer develops an application program 201, the application program 201 may call an application program interface 202 provided by the control ware 203 to communicate with the electrophoretic display devices 221-225 through various types of communication protocols. For example, the control ware 203 may communicate with the EPD device 221 having the BT port 231 through a BT driver 211, communicate with the EPD device 222 having the WIFI port 232 through a WIFI driver 212, communicate with the EPD device 223 having the NFC port 233 through an NFC driver 213, communicate with the EPD device 224 having the HDMI port 234 through an HDMI driver 214, communicate with the EPD device 225 having the USB port 235 through a USB driver 215. It should be indicated that the communication between the control ware 203 and the electrophoretic display devices 221-225 may be bidirectional. In other words, the control ware 203 may transmit data to the electrophoretic display devices 221-225, and the control ware 203 may receive data from the electrophoretic display devices 221-225.

Figure 3A:
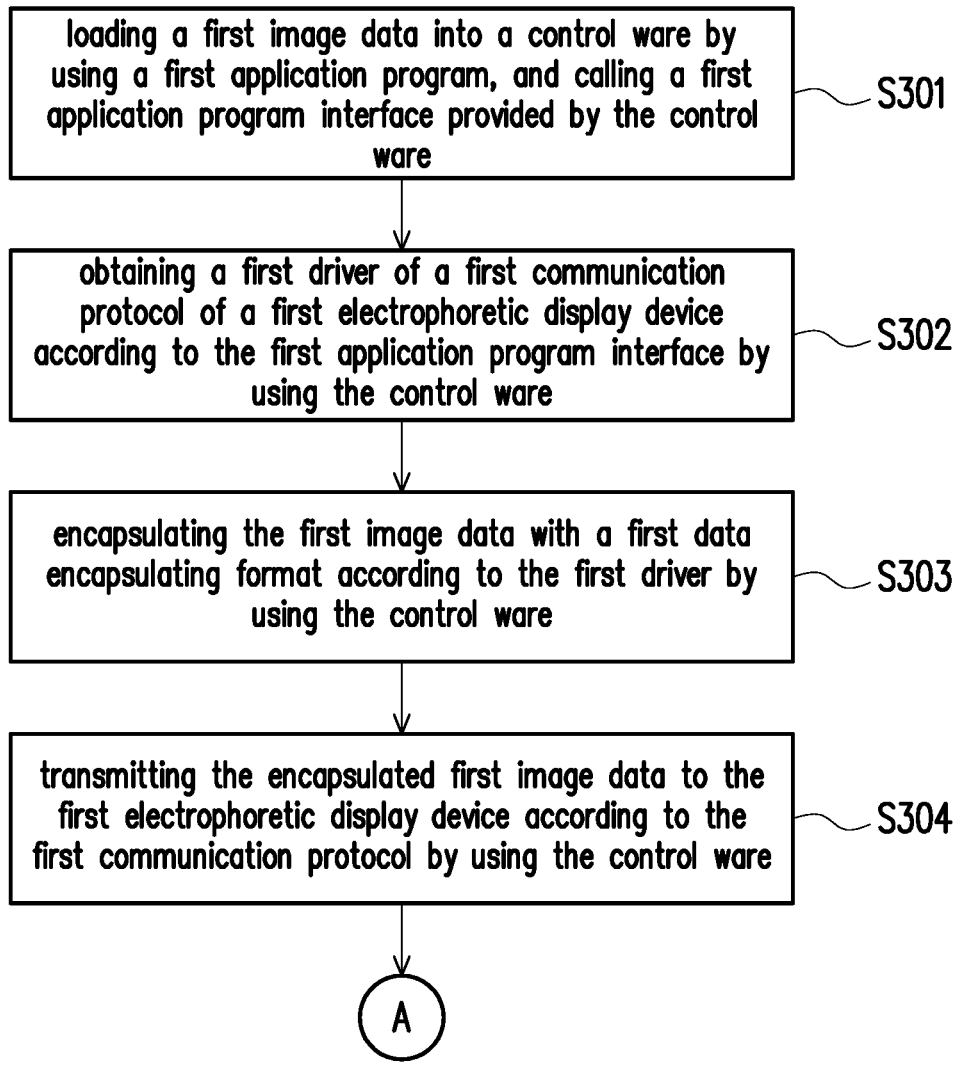
FIG. 3A and FIG. 3B are flowcharts of an electrophoretic display developing method according to an embodiment of the invention.
Figure 3B:
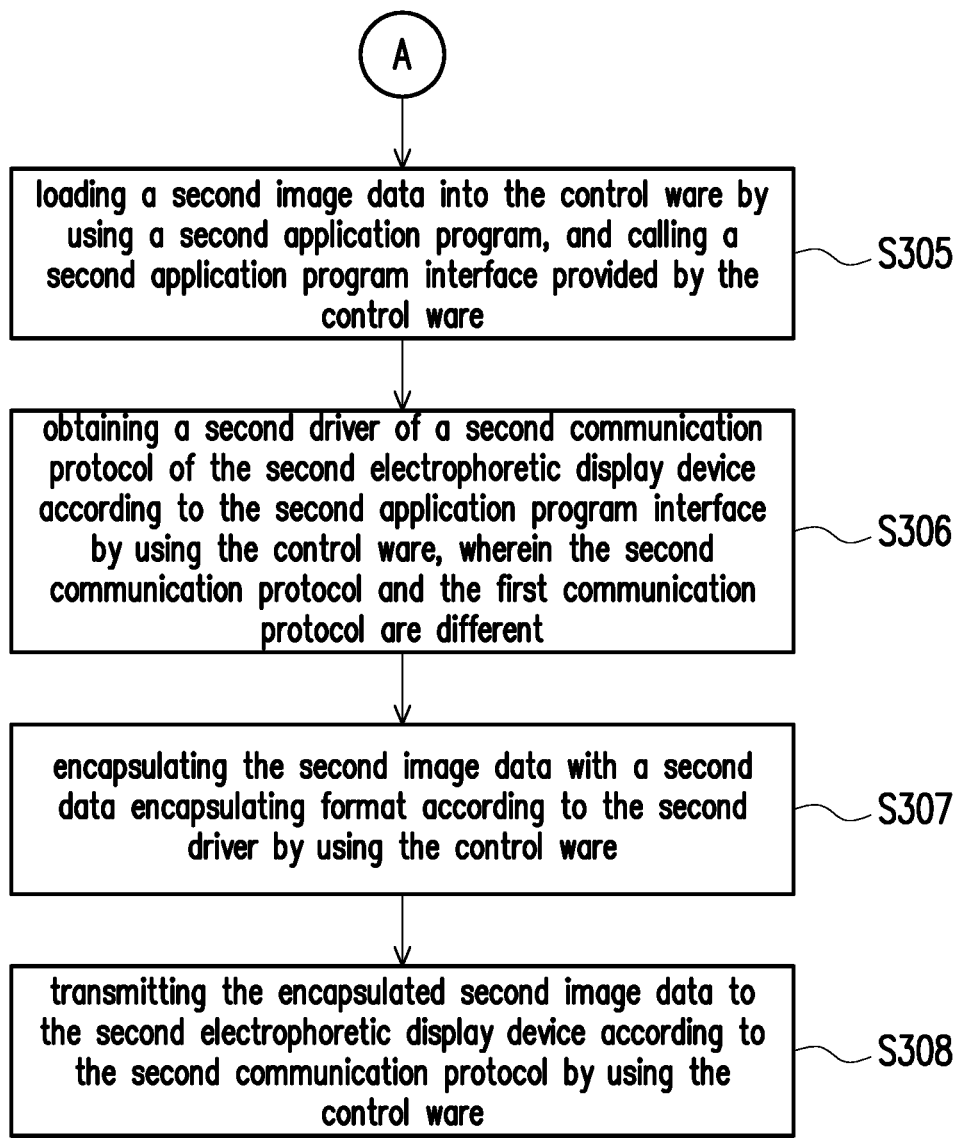

FIG. 3A and FIG. 3B are flowcharts of an electrophoretic display developing method according to an embodiment of the invention.

Referring to FIG. 3A and FIG. 3B, in step S301, a first application program loads a first image data into the control ware, and calls a first application program interface provided by the control ware. Specifically, when the first application program is to transmit the first image data to the first electrophoretic display device, the first application program may call the first application program interface provided by the control ware.

In step S302, the control ware obtains a first driver of a first communication protocol of the first electrophoretic display device according to the first application program interface. Specifically, the control ware obtains the first driver corresponding to the first communication protocol of the first electrophoretic display device, and uses the first driver to establish communication with the first electrophoretic display device. At first, the control ware initializes the communication between the control ware and the first electrophoretic display device according to the first driver. After the initialization is completed, the control ware successfully establishes the communication with the first electrophoretic display device.

In step S303, the control ware encapsulates the first image data with the first encapsulating format according to the first driver. In step S304, the control ware transmits the encapsulated first image data to the first electrophoretic display device according to the first communication protocol. Specifically, after the communication with the first electrophoretic display device is successfully established, the control ware divides the first image data into a plurality of packets with the first data encapsulating format (i.e., the data encapsulating format corresponding to the first communication protocol) with the first data encapsulating format, and transmits the packets to the first electrophoretic display device through the first communication protocol.

In step S305, the second application program loads a second image data into the control ware and calls a second application program interface provided by the control ware. In step S306, the control ware obtains a second driver of a second communication protocol of a second electrophoretic display device according to the second application program interface, wherein the second communication protocol and the first communication protocol are different. Specifically, when different application programs are to communicate with the electrophoretic display device having different communication protocols, the application program may call the different application program interface provided by the control ware to establish communication with the electrophoretic display device.

In step S307, the control ware encapsulates a second image data with a second data encapsulating format according to the second driver. In step S308, the control ware transmits the encapsulated second image data to the electrophoretic display device according to the second communication protocol.

In summary, the electrophoretic display system and developing method of the invention allow the application program to load the image data into a control ware first and call the application program interface corresponding to a specific communication protocol provided by the control ware when the application program communicates with the electrophoretic display device having a communication protocol. The control ware obtains a driver of a communication protocol of the electrophoretic display device according to the application program interface, and encapsulates the image data with a data encapsulating format according to the driver. In this manner, in the application program developed by the software developer, it is possible to directly use the application program interface provided by the control ware to communicate with the electrophoretic display device having a different communication protocol without understanding details of the communication protocol, thereby shortening the time for developing electrophoretic display device with various communication interfaces.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. An electrophoretic display system, comprising:
   an electronic device, storing a control ware;
   a first electrophoretic display device, coupled to the electronic device;
   a first application program interface (API), provided by the control ware, wherein a first application program loads a first image data into the control ware and calls the first application program interface;
   a second electrophoretic display device, coupled to the electronic device; and
   a second application program interface, provided by the control ware, wherein the second application program loads a second image data into the control ware and calls the second application program interface,
   wherein the control ware obtains a first driver of a first communication protocol of the first electrophoretic display device according to the first application program interface,
   the control ware encapsulates the first image data with a first data encapsulating format according to the first driver,
   the control ware transmits the encapsulated first image data to the first electrophoretic display device according to the first communication protocol, and
   wherein the control ware obtains a second driver of a second communication protocol of the second electrophoretic display device according to the second application program interface, wherein the second communication protocol and the first communication protocol are different,
   the control ware encapsulates the second image data with a second data encapsulating format according to the second driver,
   the control ware transmits the encapsulated second image data to the second electrophoretic display device according to the second communication protocol.

2. The electrophoretic display system according to claim 1, wherein the control ware initializes communication between the control ware and the first electrophoretic display device through the first communication protocol according to the first driver.

3. The electrophoretic display system according to claim 1, wherein the control ware divides the first image data into a plurality of packets with the first data encapsulating format, and transmits the packets to the first electrophoretic display device through the first communication protocol.

4. The electrophoretic display system according to claim 1, wherein the first communication protocol comprises a wireless fidelity (WiFi) protocol, a Bluetooth protocol, a near-field communication protocol, a serial peripheral interface (SPI) protocol, an inter-integrated circuit (I2C) protocol, a general purpose input/output (GPIO) protocol, a mobile industry processor interface (MIPI) protocol, a high definition multimedia interface (HDMI) protocol and a universal serial bus (USB) protocol.

5. An electrophoretic display developing method, adaptable for an electrophoretic display system, the electrophoretic display system comprising an electronic device, a first electrophoretic display device and a first application program interface (API), the electronic device storing a control ware, the first electrophoretic display device coupled to the electronic device, the first API provided by the control ware, the electrophoretic display system further comprising a second electrophoretic display device coupled to the electronic device and a second application program interface provided by the control ware, the electrophoretic display developing method comprising:

loading a first image data into the control ware by using a first application program, and calling the first application program interface;

obtaining a first driver of a first communication protocol of a first electrophoretic display device according to the first application program interface by using the control ware;

encapsulating the first image data with a first data encapsulating format according to the first driver by using the control ware;

transmitting the encapsulated first image data to the first electrophoretic display device according to the first communication protocol by using the control ware;

loading a second image data into the control ware by using a second application program, and calling the second application program interface;

obtaining a second driver of a second communication protocol of the second electrophoretic display device according to the second application program interface by using the control ware, wherein the second communication protocol and the first communication protocol are different;

encapsulating the second image data with a second data encapsulating foi mat according to the second driver by using the control ware; and transmitting the encapsulated second image data to the second electrophoretic display device according to the second communication protocol by using the control ware.

6. The electrophoretic display developing method according to claim 5, wherein the control ware initializes communication between the control ware and the first electrophoretic display device through the first communication protocol according to the first driver.

7. The electrophoretic display developing method according to claim 5, wherein the control ware divides the first image data into a plurality of packets with the first data encapsulating format, and transmits the packets to the first electrophoretic display device through the first communication protocol.

8. The electrophoretic display developing method according to claim 5, wherein the first communication protocol comprises a wireless fidelity (WiFi) protocol, a Bluetooth protocol, a near-field communication protocol, a serial peripheral interface (SPI) protocol, an inter-integrated circuit (I2C) protocol, a general purpose input/output (GPIO) protocol, a mobile industry processor interface (MIPI) protocol, a high definition multimedia interface (HDMI) protocol and a universal serial bus (USB) protocol.

* * * * *